(12) United States Patent
Sharma et al.

(10) Patent No.: US 11,604,984 B2
(45) Date of Patent: Mar. 14, 2023

(54) SYSTEMS AND METHODS FOR MACHINE LEARNING BASED MODELING

(71) Applicant: SHANGHAI UNITED IMAGING INTELLIGENCE CO., LTD., Shanghai (CN)

(72) Inventors: Abhishek Sharma, Cambridge, MA (US); Arun Innanje, Cambridge, MA (US); Ziyan Wu, Cambridge, MA (US); Shanhui Sun, Cambridge, MA (US); Terrence Chen, Cambridge, MA (US)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 613 days.

(21) Appl. No.: 16/686,539

(22) Filed: Nov. 18, 2019

(65) Prior Publication Data

US 2021/0150330 A1    May 20, 2021

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC ........ G06N 3/08; G06N 3/0454; G06N 7/005; G06N 20/20; G06N 20/00; G06K 9/6256
See application file for complete search history.

(56) References Cited

U.S. PATENT DOCUMENTS

| | | | |
|---|---|---|---|
| 2020/0045163 A1* | 2/2020 | Hwang | H04M 1/72451 |
| 2020/0184106 A1* | 6/2020 | Santana de Oliveira | H04W 4/38 |
| 2020/0218937 A1* | 7/2020 | Visentini Scarzanella | G06K 9/628 |
| 2020/0401929 A1* | 12/2020 | Duerig | G06N 3/084 |
| 2020/0410288 A1* | 12/2020 | Capota | G06V 30/194 |
| 2021/0035027 A1* | 2/2021 | Santos | G06N 20/20 |
| 2021/0097400 A1* | 4/2021 | Lee | G06N 3/0454 |
| 2021/0189597 A1* | 6/2021 | Czinner | B27N 3/28 |
| 2022/0004887 A1* | 1/2022 | Spratt | H04B 1/02 |

* cited by examiner

*Primary Examiner* — Daniel C Washburn
*Assistant Examiner* — Athar N Pasha
(74) *Attorney, Agent, or Firm* — Metis IP LLC

(57) ABSTRACT

A system comprising a first computing apparatus in communication with multiple second computing apparatuses. The first computing apparatus may obtain a plurality of first trained machine learning models for a task from the multiple second computing apparatuses. At least a portion of parameter values of the plurality of first trained machine learning models may be different from each other. The first computing apparatus may also obtain a plurality of training samples. The first computing apparatus may further determine, based on the plurality of training samples, a second trained machine learning model by learning from the plurality of first trained machine learning models.

17 Claims, 10 Drawing Sheets

SYSTEMS AND METHODS FOR MACHINE LEARNING BASED MODELING

TECHNICAL FIELD

The disclosure generally relates to machine learning based modeling, and more particularly relates to systems and methods for modeling based on a multi-stage training by machine learning.

BACKGROUND

Machine learning based modeling may depend on the availability of training data, which in turn involves the concerns regarding data privacy and security. For instance, each of multiple hospitals has a large amount of data, including medical data for patients, that can be used to train one or more models, e.g., deep network models, for various tasks. To protect patient privacy, it may be mandatory and/or desirable that medical datasets available at one hospital not be shared with a third party, e.g., another hospital, a vendor or manufacturer that develops such models. In order to leverage the medical datasets present across multiple hospitals, the distributed learning technique is usually used. Using a conventional distributed learning technique, the training process of a deep network model for a task may involve sharing of parameters, weights and/or gradients across different training sites (e.g., hospitals), which may cause a huge network bandwidth consumption and decrease the efficiency of the training process. And deep network models for the same task trained at different training sites need to have the same architecture for sharing parameters, weights and/or gradients, which may deprive the freedom to use or train models of different architectures across different hospitals. Therefore, it is desired to provide systems and methods for distributed learning to efficiently train deep networks for a task with improved accuracy.

SUMMARY

According to an aspect of the present disclosure, a system is provided. The system may include a first computing apparatus in communication with multiple second computing apparatus. The first computing apparatus may include at least one processor and at least one storage device storing executable instructions. When executing the executable instructions, the at least one processor may be configured to cause the system to perform the following operations. The system may obtain a plurality of first trained machine learning models for a task from the multiple second computing apparatuses. At least a portion of parameter values of the plurality of first trained machine learning models may be different from each other. The system may also obtain a plurality of training samples. The system may further determine, based on the plurality of training samples, a second trained machine learning model by learning from the plurality of first trained machine learning models.

In some embodiments, the task may include at least one of an image classification, an image segmentation, an image denoising, or an image identification.

In some embodiments, each of at least one of the multiple second computing apparatuses may include a plurality of computing units, and one of the plurality of first trained machine learning models may be provided by the each of the at least one of the multiple second computing apparatuses using the plurality of computing units by distributed learning technique.

In some embodiments, at least one of the plurality of first trained machine learning models may be provided by one of the multiple second computing apparatuses that trains a first machine learning model using a plurality of first training samples available for, among the multiple second computing apparatuses, only the one second computing apparatus.

In some embodiments, at least two of the plurality of first trained machine learning models may be constructed based on the same machine learning model or different machine learning models.

In some embodiments, to determine, based on the plurality of training samples, a second trained machine learning model by learning from the plurality of first trained machine learning model, the at least one processor may be further configured to cause the system to perform additional operations. The system may train, based on a reference output of each of the plurality of first trained machine learning models corresponding to each of the plurality of training samples, a second machine learning model using the plurality of training samples to obtain the second trained machine learning model.

In some embodiments, to train, based on a reference output of each of the plurality of first trained machine learning models corresponding to each of the plurality of training samples, the second machine learning model using the plurality of training samples, the at least one processor may be further configured to cause the system to perform additional operations. The system may initialize parameter values of the second machine learning model. The system may train the second machine learning model by iteratively updating, based the plurality of training samples, the parameter values of the second machine learning model based on the reference output of each of the plurality of first trained machine learning models corresponding to each of the plurality of training samples.

In some embodiments, iteratively updating the parameter values of the second machine learning model may include performing an iterative process. For each iteration of the iterative process, the system may input a training sample of the plurality of training samples into each of the plurality of first trained machine learning models. The system may generate the reference output using the each of the plurality of first trained machine learning models based on the training sample. The system may input the training sample and the reference output into the second machine learning model. The system may generate an estimated output of the second machine learning model based on the training sample. The system may obtain an assessment result by assessing a difference between the estimated output and the reference output. The system may update, based on the assessment result, at least some of the parameter values of the second machine learning model.

In some embodiments, obtaining an assessment result by assessing a difference between the estimated output and the reference output may include determining a value of a cost function relating to the difference between the estimated output and the reference output, and the assessment result may include whether a termination condition is satisfied, the termination condition relating to the cost function or an iteration count of the iterative process.

In some embodiments, at least one of the plurality of first trained machine learning model and the trained second machine learning model may include a deep learning model.

In some embodiments, to obtain a plurality of training samples, the at least one processor may be configured to cause the system to perform the following operations. The system may obtain a plurality of third trained machine learning models from the multiple second computing apparatuses, and generate, based on the plurality of third trained machine learning models, at least a portion of the plurality of training samples. Each of the plurality of third trained machine learning models may be configured to generate a portion of the plurality of training samples.

In some embodiments, each of the plurality of third trained machine learning models may be generated by one of the multiple second computing apparatuses that trains a third machine learning model using the plurality of third training samples available for, among the multiple second computing apparatuses, only the one second computing apparatus.

In some embodiments, the third trained machine learning model may be constructed based on one of a variational autoencoder, a disentangled variational autoencoder, and a generative adversarial network model.

In some embodiments, the at least one processor may be configured to cause the system to perform the following operations. The system may integrate the plurality of third trained machine learning models into an ensemble model. The system may generate the at least a portion of the plurality of training samples using the ensemble model.

In some embodiments, to generate the at least a portion of the plurality of training samples using the ensemble model, the at least one processor may be further configured to cause the system to perform the following operations. The system may obtain one or more samples by sampling from a probability distribution associated with the plurality of third training sample and generated by at least one of the plurality of third trained machine learning models. The system may input each of the one or more samples into the ensemble model. The system may generate, based on the each of the one or more samples, one or more second training samples using the ensemble model.

In some embodiments, the plurality of training samples may include a first portion and a second portion. The first portion of the plurality of training samples may be acquired by the first computing apparatus from a database, and the second portion of the plurality of training samples may be generated by one or more of the plurality of third trained machine learning models.

In some embodiments, the at least one processor may be configured to cause the system to perform additional following operations. The system may transmit the second trained machine learning model to at least one of the multiple second computing apparatuses.

According to another aspect of the present disclosure, a method implemented by a first computing apparatus in communication with multiple second computing apparatuses is provided. The method may include obtaining a plurality of first trained machine learning models for a task from the multiple second computing apparatuses. At least a portion of parameter values of the plurality of first trained machine learning models may be different from each other. The method may also include obtaining a plurality of training samples. The method may further include determining, based on the plurality of training samples, a second trained machine learning model by learning from the plurality of first trained machine learning models.

According to another aspect of the present disclosure, a non-transitory computer-readable medium storing instructions is provided. The instructions, when executed by at least one processor, may cause the at least one processor to implement a method. The method may include obtaining a plurality of first trained machine learning models for a task from the multiple second computing apparatuses. At least a portion of parameter values of the plurality of first trained machine learning models may be different from each other. The method may also include obtaining a plurality of training samples. The method may further include determining, based on the plurality of training samples, a second trained machine learning model by learning from the plurality of first trained machine learning models.

According to another aspect of the present disclosure, a computing apparatus is provided. The computing apparatus may include at least one processor and at least one storage device storing executable instructions. When executing the executable instructions, the at least one processor may be configured to perform the following operations. The at least one processor may obtain a plurality of first training samples. The at least one processor may obtain a first trained machine learning model by training a first machine learning model using the plurality of first training samples. The at least one processor may transmit the first trained machine learning model to a server that is configured to receive a plurality of first trained machine learning models from a plurality of computing devices. The server may also be configured to determine a second trained machine learning model by training a second machine learning model based on a plurality of second training samples and the plurality of first trained machine learning models using a teacher-student training technique. The at least one processor may receive the second trained machine learning model from the server.

According to another aspect of the present disclosure, a method is provided. The method may include obtaining a plurality of first training samples. The method may also include obtaining a first trained machine learning model by training a first machine learning model using the plurality of first training samples. The method may also include transmitting the first trained machine learning model to a server that is configured to receive a plurality of first trained machine learning models from a plurality of computing devices. The server may also be configured to determine a second trained machine learning model by training a second machine learning model based on a plurality of second training samples and the plurality of first trained machine learning models using a teacher-student training technique. The method may further include receiving the second trained machine learning model from the server.

According to another aspect of the present disclosure, a non-transitory computer-readable medium storing instructions is provided. The instructions, when executed by at least one processor, may cause the at least one processor to implement a method. The method may include obtaining a plurality of first training samples. The method may also include obtaining a first trained machine learning model by training a first machine learning model using the plurality of first training samples. The method may also include transmitting the first trained machine learning model to a server that is configured to receive a plurality of first trained machine learning models from a plurality of computing devices. The server may also be configured to determine a second trained machine learning model by training a second machine learning model based on a plurality of second training samples and the plurality of first trained machine learning models using a teacher-student training technique. The method may further include receiving the second trained machine learning model from the server.

According to another aspect of the present disclosure, a system is provided. The system may include a first computing apparatus in communication with multiple second computing apparatuses. The first computing apparatus may include at least one processor and at least one storage device storing executable instructions. When executing the executable instructions, the at least one processor may be configured to cause the system to perform the following operations. The system may obtain a plurality of generator models from the multiple second computing apparatuses. The system may also generate, based on the plurality of generator models, a plurality of training samples. Each of the plurality of generator models may be configured to generate one of the plurality of training samples. The system may further determine, based on the plurality of training samples, a trained machine learning model.

According to another aspect of the present disclosure, a method implemented by a first computing apparatus in communication with multiple second computing apparatuses is provided. The method may include obtaining a plurality of generator models from the multiple second computing apparatuses. The method may also include generating, based on the plurality of generator models, a plurality of training samples. Each of the plurality of generator models may be configured to generate one of the plurality of training samples. The method may further include determining, based on the plurality of training samples, a trained machine learning model.

According to another aspect of the present disclosure, a non-transitory computer readable medium storing instructions is provided. The instructions, when executed by at least one processor, may cause the at least one processor to implement a method. The method may include obtaining a plurality of generator models from the multiple second computing apparatuses. The method may also include generating, based on the plurality of generator models, a plurality of training samples. Each of the plurality of generator models may be configured to generate one of the plurality of training samples. The method may further include determining, based on the plurality of training samples, a trained machine learning model.

According to another aspect of the present disclosure, a computing device is provided. The computing device may include at least one processor and at least one storage device storing executable instructions. When executing the executable instructions, the at least one processor may be configured to perform the following operations. The at least one processor may obtain a plurality of first training samples. The at least one processor may also obtain, based on the plurality of first training samples, a generator model. The at least one processor may also transmit the generator to a server that is configured to receive a plurality of generator models from a plurality of computing devices. The server may also be configured to determine a trained machine learning model using a plurality of second training samples at least a portion of which is generated by the plurality of generator models. The at least one processor may further receive the trained machine learning model from the server. The generator model may be configured to generate one of the at least a portion of the plurality of training samples.

According to another aspect of the present disclosure, a method is provided. The method may include obtaining a plurality of first training samples. The method may also include obtaining, based on the plurality of first training samples, a generator model. The method may also include transmitting the generator to a server that is configured to receive a plurality of generator models from a plurality of computing devices. The server may also be configured to determine a trained machine learning model using a plurality of second training samples at least a portion of which is generated by the plurality of generator models. The method may further include receiving the trained machine learning model from the server. The generator model may be configured to generate one of the at least a portion of the plurality of training samples.

According to another aspect of the present disclosure, a non-transitory computer readable medium storing instructions is provided. The instructions, when executed by at least one processor, may cause the at least one processor to implement a method The method may include obtaining a plurality of first training samples. The method may also include obtaining, based on the plurality of first training samples, a generator model. The method may also include transmitting the generator to a server that is configured to receive a plurality of generator models from a plurality of computing devices. The server may also be configured to determine a trained machine learning model using a plurality of second training samples at least a portion of which is generated by the plurality of generator models. The method may further include receiving the trained machine learning model from the server. The generator model may be configured to generate one of the at least a portion of the plurality of training samples.

According to another aspect of the present disclosure, a system is provided. The system may include a first computing apparatus in communication with multiple second computing apparatuses. The first computing apparatus may include an acquisition module and a determination module. The acquisition module may be configured to obtain a plurality of first trained machine learning models for a task from the multiple second computing apparatuses. At least a portion of parameter values of the plurality of first trained machine learning models may be different from each other. The acquisition module may also be configured to obtain a plurality of training samples. The determination module may be configured to determine, based on the plurality of training samples, a second trained machine learning model by learning from the plurality of first trained machine learning models.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
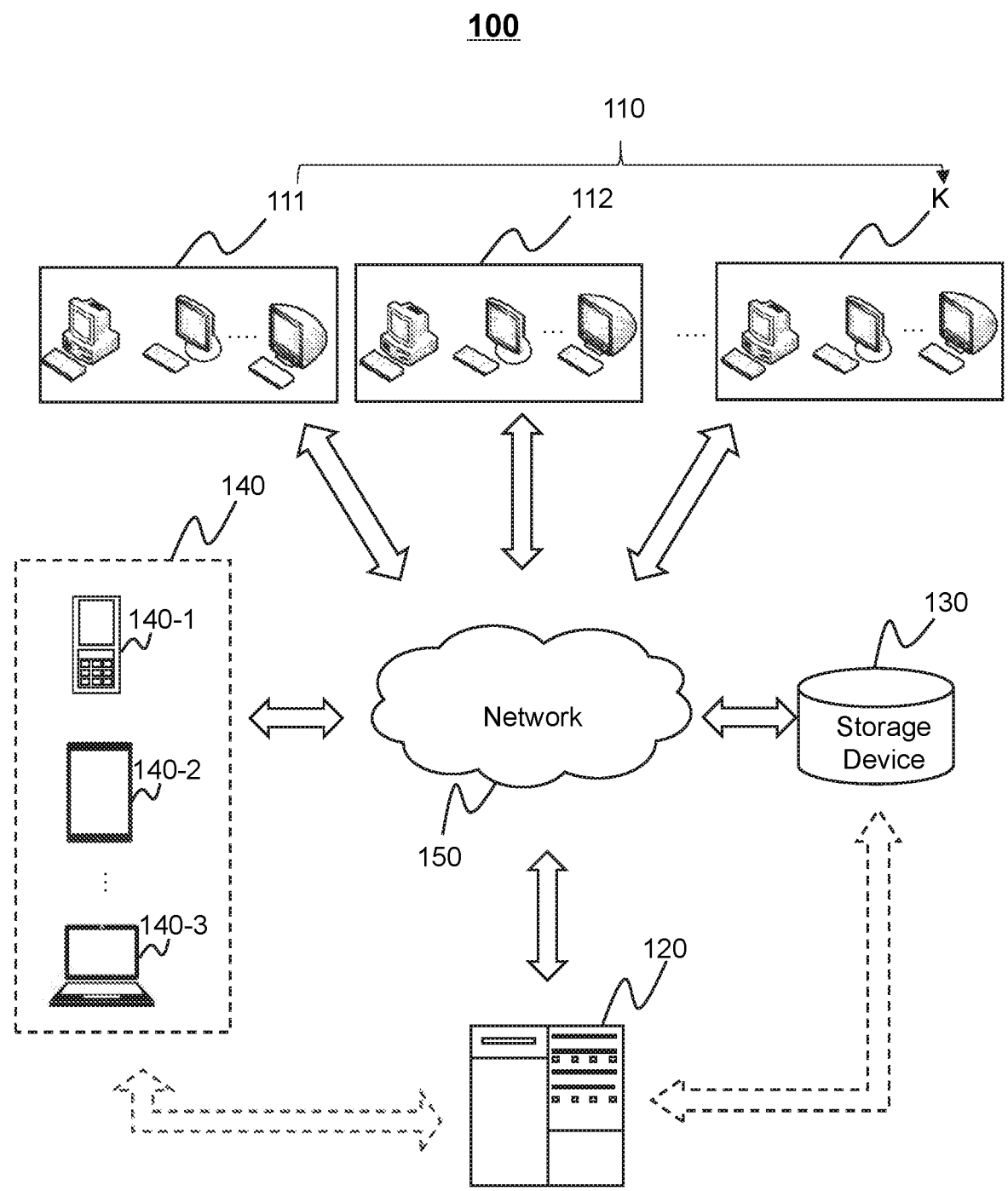
FIG. 1 is an exemplary schematic diagram illustrating a distributed learning system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

Provided herein are systems and methods for distributed learning. A system may include a first computing apparatus (e.g., a headquarters server) in communication with multiple second computing apparatuses (e.g., workers). The first computing apparatus (e.g., the headquarters server) may include at least one storage device storing executable instructions, and at least one processor in communication with the at least one storage device. When executing the executable instructions, the first computing apparatus (e.g., the headquarters server) may obtain a plurality of first trained machine learning models for a task from the multiple second computing apparatuses. The first computing apparatus (e.g., the headquarters server) may also obtain a plurality of training samples and determine, based on the plurality of training samples and the plurality of first trained machine learning models, a second trained machine learning model using a teacher-student training technique. The first computing apparatus (e.g., the headquarters server) may further transmit the second trained machine learning model to at least one of the multiple second computing apparatuses.

Accordingly, the modeling or model training may be performed in a multi-stage process, one at the hospital level and one at the headquarters level, based on a teacher-student training technique. The first computing apparatus (e.g., a headquarters server) may directly obtain the plurality of first trained machine learning models for the task from the multiple second computing apparatuses (e.g., workers) after each of the plurality of first trained machine learning models is trained at the level of an individual hospital using the data available at that hospital. The multi-stage modeling based on a teacher-student training technique as disclosed herein may avoid the need to share patient data available at a hospital outside the hospital, thereby alleviating the data privacy and security concerns. The multi-stage modeling based on a teacher-student training technique as disclosed herein may also obviate the need to share parameters/gradients among the multiple second computing apparatuses (e.g., the workers) and/or between the first computing apparatus (e.g., the headquarters server) and the multiple second computing apparatuses during the training of the plurality of first trained machine learning models, which may significantly reduce the network bandwidth consumption and dependency. Moreover, the multi-stage modeling based on a teacher-student training technique as disclosed herein may improve the efficiency of model training because the training at the level of individual hospitals is performed in parallel without the need to synchronize the progress of the model training at the individual hospitals. Still more, the plurality of first trained machine learning models do not need to be built based on the same architecture for sharing parameters/gradients, allowing the freedom for various second computing apparatuses to train models of different architectures. Such models may be chosen based on one or more factors including, e.g., data structures of data available at various training sites, hardware and software of various second computing apparatuses, prior trainings already performed on individual second computing apparatuses or training sites, or the like, or a combination thereof. The first computing apparatus (e.g., the headquarters server) may further train a student model (i.e., the second trained machine learning model) for the task based on the plurality of first trained machine learning models using a teacher-student technique. During the training process of the student model, the plurality of first trained machine learning models may serve as multiple teacher models. The student model may learn from the multiple teacher models (i.e., the first trained machine learning models) to achieve better performance and generalization than the multiple teacher models by taking advantage of the large amounts of patient data available at multiple hospitals but circumventing the need to directly transmit patient data across the boundaries of these individual hospitals, thereby obviating the risks of compromising data privacy and security and/or running afoul with relevant law or regulations and/or reducing the network bandwidth consumption and dependency.

In some embodiments, the first computing apparatus (e.g., the headquarters server) may also obtain multiple generator models from the multiple second computing apparatuses. Each generator model may be trained by, among the multiple second computing apparatuses, only one second computing apparatus to learn a probability distribution of data that is used to train the each generator model and available for that individual second computing apparatus. Each generator model may be configured to generate the training samples for training the student model based on the probability distribution. Accordingly, the system may leverage data distributed across multiple training sites (e.g., hospitals, medical institutions, etc.) to train the generator models for generating training samples. The system and method may train the student model based on the training samples generated by such a generator model, thereby compensating for the scarcity of training samples available for the first computing apparatus (due to, e.g., the prohibition or avoidance of sharing patient data available at individual hospitals) and improving the accuracy of the student model.

Various embodiments of the present disclosure are described with reference to the modeling or model training based on patient data available at individual hospitals. It is understood that this is for illustration purposes and not intended to be limiting. The multi-stage modeling based on a teacher-student training technique disclosed herein may be used in other applications including, e.g., financial industry, security industry, etc. The multi-stage modeling may include training on second computing apparatuses based on data available at multiple individual training sites and feeding teacher models trained on the second computing apparatuses to a first computing apparatus for further training to provide a trained student model. Teacher models trained on various second computing apparatuses may be of different architectures. Various benefits of the multi-stage modeling based on teacher-student training technique described herein include, e.g., improving the performance of the student model by taking advantage of large amounts of data available at multiple training sites but circumventing the need to directly transmit data across the boundaries of these individual training sites, thereby obviating the risks of compromising data privacy and security and/or running afoul with relevant law or regulations, improved efficiency for the training process, the freedom for various second computing apparatuses to train models of different architectures, and/or reducing the network bandwidth consumption and dependency. In some embodiments, to compensate for the scarcity of training samples available for the first computing apparatus (due to, e.g., the prohibition or avoidance of sharing data available only at individual training sites) and improving the accuracy of the student model, a generator model may be generated using the multi-stage modeling based on a teacher-student training technique disclosed herein, which further enjoys the benefits associated with the multi-stage modeling based on a teacher-student training technique disclosed herein.

FIG. 1 is an exemplary schematic diagram illustrating a distributed learning system 100 according to some embodiments of the present disclosure. In some embodiments, the distributed learning system 100 may be applied to a medical system (e.g., an imaging system, a treatment system), a security system, an intelligent transportation system (ITS), a monitoring system, an industry controlling system, an identity identification (ID) system, etc. For brevity, a medical system may be taken for descriptions of the present disclosure. Merely by way of example, the distributed learning system 100 may include one or more second computing apparatuses 110, a first computing apparatus 120, a storage device 130, one or more terminal device(s) 140, and a network 150. The components in the distributed learning system 100 may be connected in one or more of various ways. Merely by way of example, the storage device 130 may be connected to the first computing apparatus 120 directly (as indicated by the bi-directional arrow in dotted lines linking the storage device 130 and the first computing apparatus 120) or through the network 150. As another example, the first computing apparatus 120 may be connected to the terminal device(s) 140 directly (as indicated by the bi-directional arrow in dotted lines linking the first computing apparatus 120 and the terminal device(s) 140) or through the network 150.

The one or more second computing apparatuses 110 may include a second computing apparatus 111, a second computing apparatus 112, ..., and a second computing apparatus K. In some embodiments, a second computing apparatus may be also referred to as a worker. The one or more second computing apparatuses may be located at different geographical positions or belong to different entities (e.g., different hospitals). A geographical position (e.g., a hospital) including a second computing apparatus may be also referred to as a training site. In some embodiments, a second computing apparatus may be connected to and/or communicate with one or more components of the distributed learning system 100 (e.g., the first computing apparatus 120) via a wireless connection, a wired connection, or a combination thereof. For example, a second computing apparatus may transmit data/information (e.g., a trained machine learning model) to the first computing apparatus 120 via the network 150. As another example, a second computing apparatus may receive data/information (e.g., a trained second machine learning model) from the first computing apparatus 120 via the network 150. In some embodiments, the second computing apparatuses are not connected with or do not communicate with each other and run separately to execute exemplary methods/systems as described in the present disclosure. For example, the one or more second computing apparatuses 110 may not share information/data with each other.

A second computing apparatus (e.g., the second computing apparatus 111) may process data and/or information obtained from a medical device (e.g., an MR device, a CT device, a PET device, etc.) (not shown), the terminal(s) 140, and/or the storage device 130. In some embodiments, a second computing apparatus may be configured to perform a task (also referred to as a computing task) using a trained machine learning model. The task may include a computing task based on image, such as an image classification, an image segmentation, an image denoising, an image identification, an image enhancement, an image super-resolution processing, an image artifact removing, an image diagnosis, etc. In some embodiments, a second computing apparatus may be configured to generate one or more trained machine learning models, etc., based on data available for only the one second computing apparatus among the second computing apparatuses 110. For example, a second computing apparatus may be configured to generate a trained machine learning model for a task, etc., based on data (i.e., training samples) available for only the one second computing apparatus among the second computing apparatuses 110. As another example, a second computing apparatus may be configured to generate a generator model, etc., based on data (i.e., training samples) available for only the one second computing apparatus among the second computing apparatuses 110. The generator model may be trained to learn a probability distribution of the training samples that are used for training the generator model. The generator model may be configured to generate, based on the probability distribution, one or more training samples different from each of the training samples that are used for training the generator model. As used herein, a training sample acquired by an imaging device (e.g., a CT device, an MR device, etc.) via scanning a subject may be also referred to as real data. A training sample generated by the generator model may be also referred to as simulated data.

In some embodiments, a second computing apparatus may include one or more processors and storage. The storage may store a medical dataset or database that includes a plurality of images available for only the one second computing apparatus itself. In some embodiments, a second computing apparatus may include multiple computers or computing units (also referred to as computing nodes). The multiple computers or computing units may be connected and/or communicate with each other via a wireless connection or wired connection. A second computing apparatus may process data and/or information, for example, execute one or more computing tasks, training one or more machine learning models, etc., using the multiple computing devices. In some embodiments, the second computing apparatus may train a machine learning model based on the multiple computing units using a distributed learning technique. Merely by way of example, one of the multiple computing units of a second computing apparatus may serve as a parameter server. Others may serve as workers. The parameter server may distribute a copy of a machine learning model for a task with initialized parameters to each of the multiple computing units (i.e., workers) of the second computing apparatus. For each iteration, each of the multiple computing units may train the machine learning model for the task based on a training sample to generate a group of local parameters and transfer the group of local parameters to the parameter server. The parameter server may determine a group of global parameters by averaging multiple groups of located parameters generated by the multiple computing devices and transmit the group of global parameters to the each of the workers for updating the group of local parameters. At the ending of the training process, the machine learning model with the group of global parameters generated by each of the multiple computing units may be designated as a trained machine learning model for the task. As another example, the second computing apparatus may distribute different parts of a machine learning model with initialized parameters to each of the multiple computing devices. For example, each layer of the machine learning model may be assigned to a computing device. Each of the multiple computing devices may train the assigned part of the machine learning model based on the same training samples to generate parameters of the assigned part of the machine learning model and transfer the parameters to the second computing apparatus. The second computing apparatus may combine the parameters generated by each computing device to obtain the trained machine learning model.

Each of the computing device(s) may include at least one processor and at least one storage device. In some embodiments, a computing device described herein may be any suitable computer, such as a laptop, a tablet computer, a desktop, etc. A processor described herein may include a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof. The at least one storage device may store data (e.g., parameters of a machine learning model), instructions, and/or any other information. In some embodiments, the at least one storage device of a computing device may store training samples used for training a machine learning model. In some embodiments, the storage device may store algorithms and/or instructions that the at least one processor may execute or use to perform exemplary systems/methods described in the present disclosure.

The first computing apparatus 120 may process data and/or information obtained from the second computing apparatuses 110, the terminal(s) 140, and/or the storage device 130. For example, the first computing apparatus 120 may obtain a plurality of first trained machine learning models for a task from the second computing apparatuses 110. The first computing apparatus 120 may also obtain a plurality of training samples. The first computing apparatus 120 may further determine, based on the plurality of training samples and the plurality of first trained machine learning models, a second trained machine learning model using a teacher-student training technique. As another example, the first computing apparatus 120 may obtain a plurality of third trained machine learning models (i.e., the generator models) from the second computing apparatuses. The first computing apparatus 120 may generate at least a portion of the plurality of training samples for training the second machine learning model based on at least one of the plurality of third trained machine learning models. In some embodiments, the first computing apparatus may serve as a headquarters. Each of the second computing apparatuses may server as a worker. In some embodiments, the first computing apparatuses 120 may include multiple computers or computing units (also referred to as computing nodes). The multiple computers or computing units may be connected and/or communicate with each other via a wireless connection or wired connection.

The trained second machine learning model may be updated from time to time, e.g., periodically or not, based on a sample set that is at least partially different from the original sample set from which the original trained second machine learning model is determined and/or based on the updating of the first trained machine learning model. For instance, the trained second machine learning model may be updated based on a sample set including new samples that are not in the original sample set, samples processed using the machine learning model in connection with the original trained second machine learning model of a prior version, or the like, or a combination thereof. As another example, the trained second machine learning model may be updated based on the updating of at least a portion of the first trained machine learning models in connection with the original first trained machine learning model of a prior version, or the like, or a combination thereof. In some embodiments, a first trained machine learning model may be updated from time to time, e.g., periodically or not, based on a sample set that is at least partially different from the original sample set from which the original first trained machine learning model is determined. The first trained machine learning models may be updated synchronously or asynchronously by the one or more second computing apparatus 110.

The first computing apparatus 120 may include one or more processors. In some embodiments, the first computing apparatus 120 may be a computer, a user console, a single server or a server group, etc. The server group may be centralized or distributed. In some embodiments, the first computing apparatus 120 may be local or remote. For example, the first computing apparatus 120 may access information and/or data stored in the second computing apparatuses 110, the terminal(s) 140, and/or the storage device 130 via the network 150. As another example, the first computing apparatus 120 may be directly connected to the terminal(s) 140 and/or the storage device 130 to access stored information and/or data. In some embodiments, the first computing apparatus 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 130 may store data, instructions, and/or any other information. In some embodiments, the storage device 130 may store data obtained from one or more components of the distributed learning system 100 (e.g., the second computing apparatuses 110, the terminal(s) 140 and/or the first computing apparatus 120). For example, the storage device may store first trained machine learning models, third trained machine learning models, and/or training samples acquired by the first computing apparatus 120. As another example, the storage device 130 may store algorithms and/or models for generating a trained second machine learning model, etc. In some embodiments, the storage device 130 may store data and/or instructions that the first computing apparatus 120 may execute or use to perform exemplary methods/systems described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the distributed learning system 100 (e.g., the terminal(s) 140, the first computing apparatus 120, etc.). One or more components in the distributed learning system 100 may access the data or instructions stored in the storage device 130 via the network 150. In some embodiments, the storage device 130 may be directly connected to or communicate with one or more other components in the distributed learning system 100 (e.g., the first computing apparatus 120, the terminal(s) 140, etc.). In some embodiments, the storage device 130 may be part of the first computing apparatus 120.

The terminal(s) 140 may include a mobile device 140-1, a tablet computer 140-2, a laptop computer 140-3, or the like, or any combination thereof. In some embodiments, the mobile device 140-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 140 may be part of the first computing apparatus 120.

In some embodiments, the terminal(s) 140 may send and/or receive information to one of the second computing apparatuses 110 and/or the first computing apparatus 120 via a user interface. In some embodiments, the user interface may be in the form of an application implemented on the terminal(s) 140. The user interface may be configured to facilitate communication between the terminal(s) 140 and a user associated with the terminal(s) 140. In some embodiments, a user may provide, via the user interface, an input of a request for model training. The terminal(s) 140 may send the request for model training to the second computing apparatuses 110 and/or the first computing apparatus 120. The second computing apparatuses 110 and/or the first computing apparatus 120 may perform the process for model training as described elsewhere in the present disclosure.

The network 150 may include any suitable network that can facilitate the exchange of information and/or data for the distributed learning system 100. In some embodiments, the second computing apparatuses 110, the storage device 130, the terminal(s) 140, the first computing apparatus 120, etc., may communicate information and/or data with one or more other components of the distributed learning system 100 via the network 150. For example, the first computing apparatus 120 may obtain one or more first trained machine learning models for a task from the second computing apparatuses 110 via the network 150. As another example, the first computing apparatus 120 may obtain user instructions from the terminal(s) 140 via the network 150. As still another example, the second computing apparatuses 110 may receive the second trained machine learning model from the first computing apparatus 120 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the distributed learning system 100 may be connected to the network 150 to exchange data and/or information.

It should be noted that the above description of the distributed learning system 100 is merely provided for the purposes of illustration, and not intended to limit the scope of the present disclosure. For persons having ordinary skills in the art, multiple variations and modifications may be made under the teachings of the present disclosure. For example, the assembly and/or function of the distributed learning system 100 may be varied or changed according to specific implementation scenarios.

Figure 2:
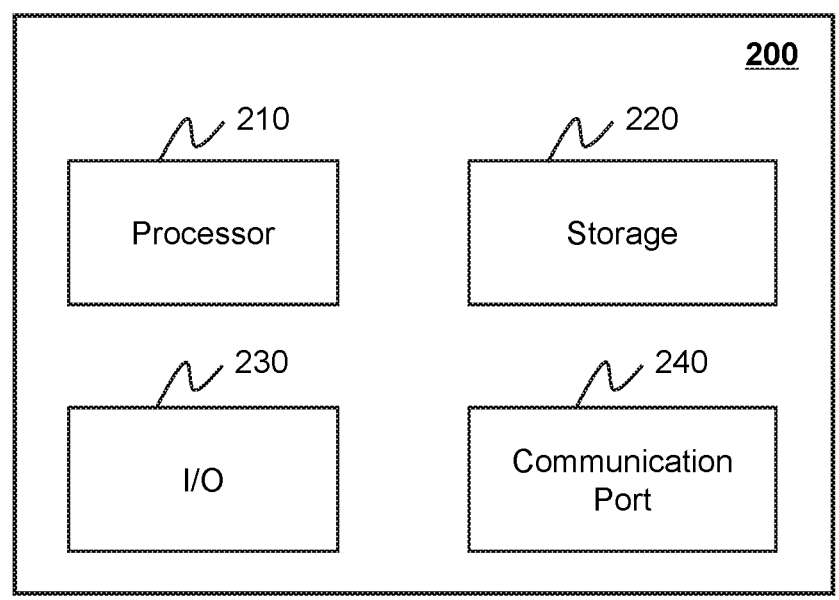
FIG. 2 is a schematic diagram illustrating hardware and/or software components of an exemplary computing device on which the first computing apparatus and/or one of the second computing apparatuses may be implemented according to some embodiments of the present disclosure.

FIG. 2 is a schematic diagram illustrating hardware and/or software components of an exemplary computing device 200 on which the first computing apparatus 120 and/or one of the second computing apparatuses 110 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (program codes) and perform functions of the first computing apparatus 120 in accordance with techniques described herein. The computer instructions may include, for example, routines, programs, objects, components, signals, data structures, procedures, modules, and functions, which perform particular functions described herein. In some embodiments, the processor 210 may perform instructions obtained from the terminal(s) 140. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the second computing apparatuses 110, the terminal(s) 140, the storage device 130, or any other component of the distributed learning system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the first computing apparatus 120 for determining the second trained machine learning model.

The I/O 230 may input or output signals, data, and/or information. In some embodiments, the I/O 230 may enable user interaction with the first computing apparatus 120. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the first computing apparatus 120 and the second computing apparatus(s), the terminal(s) 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G, etc.), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

In some embodiments, a second computing apparatus (e.g., the second computing apparatus 111, the second computing apparatus 112, . . . , or the second computing apparatus K) may be implemented on a computing device the same as or similar to the computing device 200.

Figure 3:
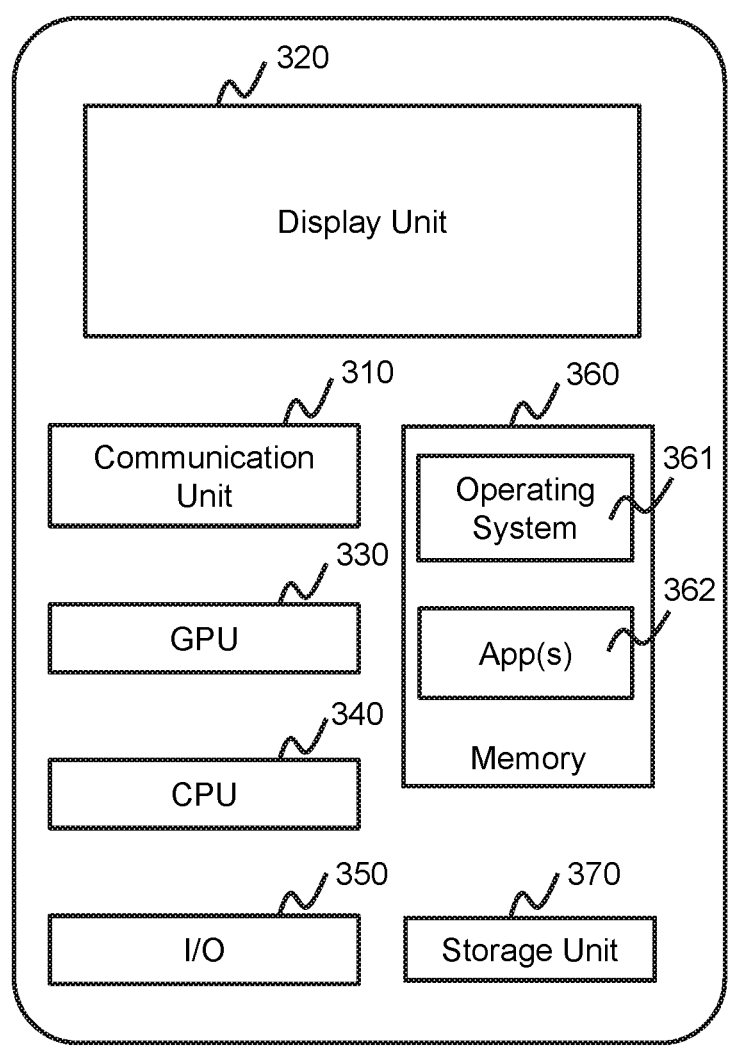
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage unit 370. In some embodiments, any other suitable component, including but not limited to a system bus or a controller (not shown), may also be included in the mobile device 300. In some embodiments, a mobile operating system 361 (e.g., iOS, Android, Windows Phone, etc.) and one or more applications 362 may be loaded into the memory 360 from the storage unit 370 in order to be executed by the CPU 340. The applications 362 may include a browser or any other suitable mobile apps for receiving and rendering information relating to image processing or other information from the first computing apparatus 120. User interactions with the information stream may be achieved via the I/O 350 and provided to the first computing apparatus 120 and/or other components of the distributed learning system 100 via the network 150.

To implement various modules, units, and functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4:
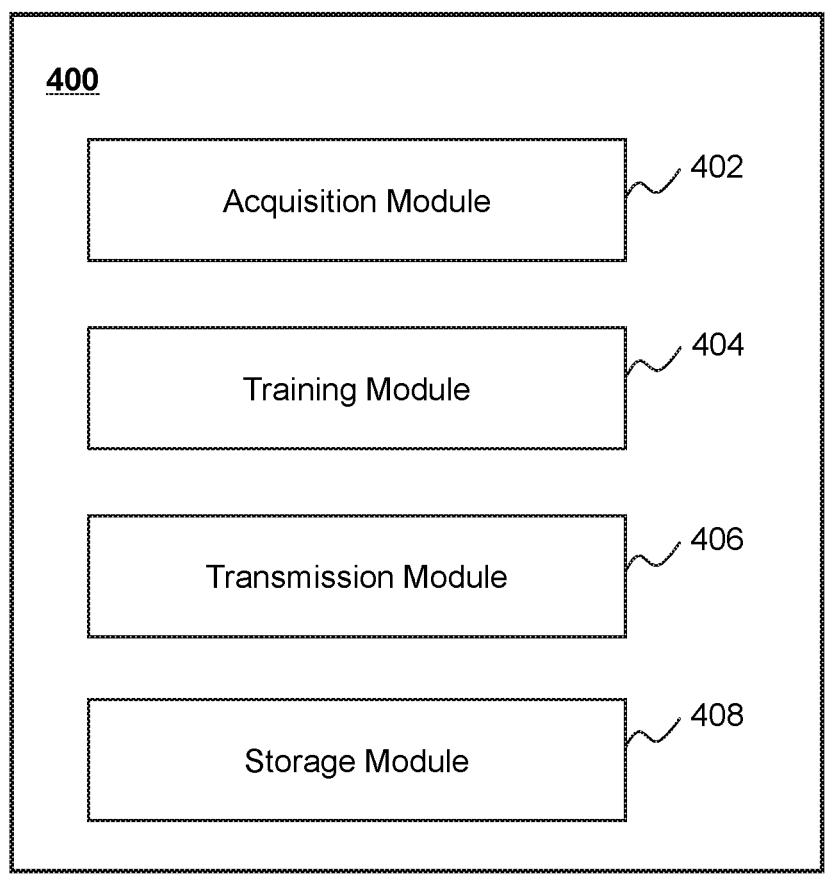
FIG. 4 is a block diagram illustrating an exemplary first computing apparatus or second computing apparatus according to some embodiments of the present disclosure.

FIG. 4 is a block diagram illustrating an exemplary first computing apparatus 120 or second computing apparatus 110 according to some embodiments of the present disclosure. In some embodiments, the first computing apparatus 120 or the second computing apparatus 110 may be implemented on a computing device 200 (e.g., the processor 210) illustrated in FIG. 2 or a CPU 340 as illustrated in FIG. 3. As illustrated in FIG. 4, the first computing apparatus 120 or the second computing apparatus 110 may include an acquisition module 402, a training module 404, a transmission module 406, and a storage module 408. Each of the modules described above may be a hardware circuit that is designed to perform certain actions, e.g., according to a set of instructions stored in one or more storage media, and/or any combination of the hardware circuit and the one or more storage media.

The acquisition module 402 may obtain data/information from one or more components of the distributed learning system 100. For the first computing apparatus 120, the acquisition module 402 may obtain a plurality of trained models (e.g., first trained machine learning models for a task and/or generator models) from the second computing apparatuses 110. The acquisition module 402 may also obtain a plurality of training samples from a storage device (e.g., the storage device 130, the storage 220, the storage unit 370, or a storage module 408) and/or a data resource of a third party (e.g., a public medical image database). In some embodiments, the acquisition module 402 may obtain the plurality of training samples based on the generator models. For the second computing apparatus 110, the acquisition module 402 may obtain training samples that are available for only the second computing apparatus 110. More descriptions regarding the trained models and training samples may be found elsewhere in the present disclosure (e.g., FIGS. 5 and 8 and the descriptions thereof).

The training module 404 may be configured to determine one or more trained machine learning models of the distributed learning system 100. For the first computing apparatus 120, the training module 404 may determine a second trained machine learning model (e.g., a student model as described elsewhere in the present disclosure) by training a second machine learning model using second training samples. For the second computing apparatus 110, the training module 404 may determine a first trained machine learning model I (e.g., a teacher model as described elsewhere in the present disclosure) by training a first machine learning model using first training samples, and/or determine a generator model by training a third machine learning model using third training samples. More descriptions regarding training processes may be found elsewhere in the present disclosure (e.g., FIGS. 5-10 and the descriptions thereof).

The transmission module 406 may be configured to execute data/information exchange between the first computing apparatus 120 or the second computing apparatus 110 and other components of the distributed learning system 100. For the first computing apparatus 120, the transmission module 406 may send a request for acquiring first trained machine learning models and/or generator models to the second computing apparatuses 110 and transmit a second trained machine learning model to the second computing apparatuses 110. The transmission module 406 may also send a request for acquiring second training samples to the storage device 130. For the second computing apparatus 110, the transmission module 406 may receive a request for acquiring a first trained machine learning model and/or a generator model from the first computing apparatus 120 and receive the second trained machine learning model from the first computing apparatus 120.

The storage module 408 may store information/data. The information may include programs, software, algorithms, machine learning models, training data, control parameters, or the like, or a combination thereof. For the first computing apparatus 120, the storage module 408 may store second training samples, a second machine learning model, a second trained machine learning model, etc. In some embodiments, the storage module 408 may store one or more programs and/or instructions that may be executed by the first computing apparatus 120 to perform exemplary methods described in this disclosure. For example, the storage module 408 may store program(s) and/or instruction(s) that can be executed by the first computing apparatus 120 to acquire second training samples, obtain first trained machine learning models, obtain generator models, train a second machine learning model, and/or transmit a second trained machine learning model to the second computing apparatus(s). For the second computing apparatus 110, the storage module 408 may store first/third training samples, a first machine learning model, a generator model, a first trained machine learning model, a generator model, etc. In some embodiments, the storage module 408 may store one or more programs and/or instructions that may be executed by the second computing apparatus 110 to perform exemplary methods described in this disclosure. For example, the storage module 408 may store program(s) and/or instruction(s) that can be executed by the second computing apparatus 110 to acquire first/third training samples, train a first/third machine learning model, and/or send a first/third trained machine learning model to the first computing apparatus 120.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, the storage module 408 may be omitted in the first computing apparatus 120 and/or the second computing apparatus 110. As another example, some other components/modules may be added into the first computing apparatus 120 and/or the second computing apparatus 110.

Figure 5:
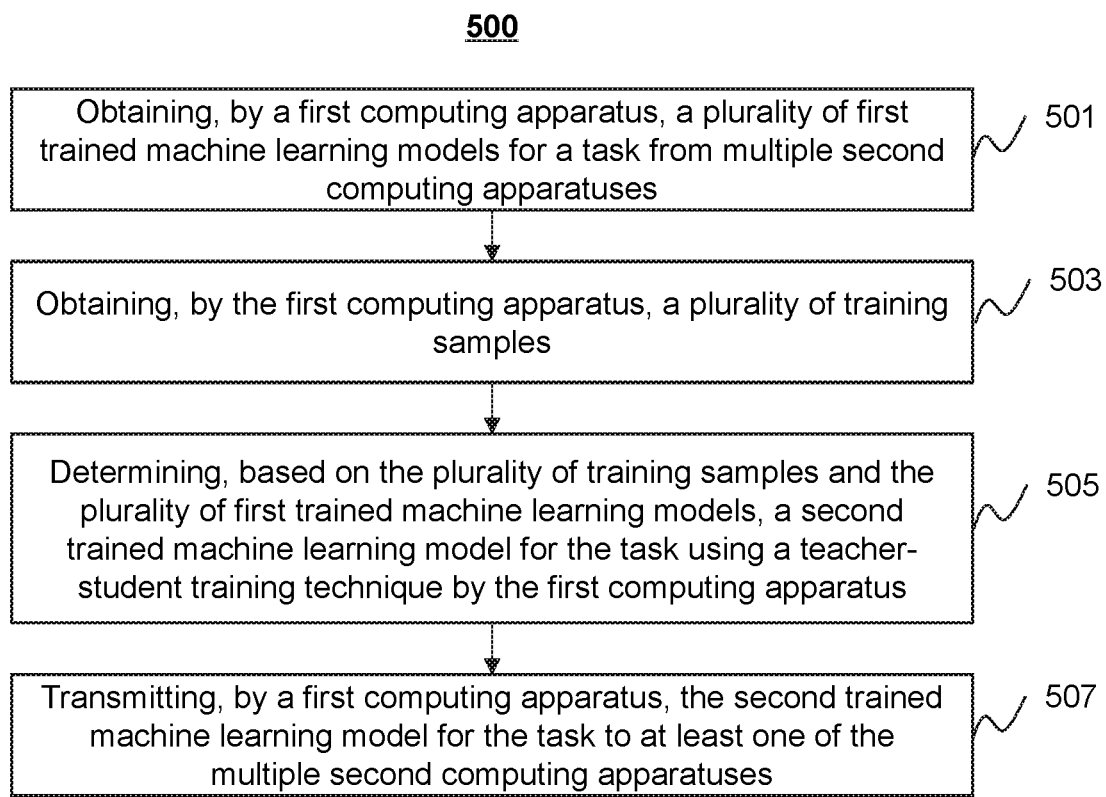
FIG. 5 is a schematic flowchart illustrating an exemplary process for determining a trained machine learning model for a task according to some embodiments of the present disclosure.

FIG. 5 is a schematic flowchart illustrating an exemplary process for determining a trained machine learning model for a task according to some embodiments of the present disclosure. In some embodiments, process 500 may be implemented as a set of instructions (e.g., an application) stored in the storage device 130, storage 220, or storage 390. The first computing apparatus 120, the processor 210 and/or the CPU 340 may execute the set of instructions, and when executing the instructions, the first computing apparatus 120, the processor 210 and/or the CPU 340 may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of the process 500 illustrated in FIG. 5 and described below is not intended to be limiting.

In 501, the first computing apparatus 120 (e.g., the acquisition module 402) may obtain a plurality of first trained machine learning models for a task from multiple second computing apparatuses (e.g., the second computing apparatus 111, the second computing apparatus 112, . . . , and the second computing apparatus N). In some embodiments, the first computing apparatus 120 may be also referred to as a headquarters. The first computing apparatus 120 may include a server, a computer, a workstation, one or more computing units (e.g., GPUs, computer cards, etc.), etc. In some embodiments, a second computing apparatus may be also referred to as a worker. A second computing apparatus may include a server, a computer, a workstation, one or more computing units (e.g., GPUs, computer cards, etc.), etc. More descriptions for a second computing apparatus may be found elsewhere in the present disclosure. In some embodiments, the task may include image classification, image segmentation, image denoising, image identification, image enhancement, image artifact removing, etc. For example, the task may include an image classification associated with lung cancer prediction based on medical images. That is, each of the plurality of first trained machine learning models may be configured to predict lung cancers based on an inputted image (e.g., a chest X-ray image, a CT image, a PET image, or an MR image). Each of the plurality of first trained machine learning models may generate a prediction result including whether an inputted image is indicative of lung cancer.

In some embodiments, at least one of the first trained machine learning models may include a supervised learning model, a semi-supervised learning model, an unsupervised learning model, or the like. In some embodiments, a first trained machine learning model may be constructed based on a deep learning model. Exemplary deep learning models may include at least one of a convolutional neural network (CNN) model, a fully convolutional neural network (FCN) model, a generative adversarial network (GAN) model, a backpropagation (BP) machine learning model, a radial basis function (RBF) model, a deep belief nets (DBN) model, an Elman model, or the like, or a combination thereof. At least two of the plurality of first trained machine learning models may be constructed based on machine learning models of the same type or different types. For example, a first trained machine learning model obtained from the second computing apparatus 111 may be constructed based on a CNN model, and a first trained machine learning model obtained from the second computing apparatus 112 may be constructed based on an FCN model. As another example, first trained machine learning models obtained from the second computing apparatus 111 and the second computing apparatus 112 may be constructed based on a CNN model. In some embodiments, architecture parameters of at least two of the plurality of first trained machine learning models may be partially or entirely different. Exemplary architecture parameters may include the size of a kernel of a layer, the total count (or number) of layers, the count (or number) of nodes in each layer, a learning rate, a minibatch size, an epoch, etc. For example, two first trained machine learning models constructed based on machine learning models of the same type (e.g., CNN) may include the same or different total counts of layers, the same or different minibatch sizes, etc. In some embodiments, learning parameters (e.g., a connected weight between two connected nodes, a bias vector relating to a node, etc.) of at least two of the plurality of first trained machine learning models may be partially or entirely different.

In some embodiments, the multiple second computing apparatuses may be located at different geographical positions or belong to different entities (e.g., different hospitals or medical institutions). A first trained machine learning model may be provided by one of the multiple second computing apparatuses via training a first machine learning model using a plurality of first training samples. The plurality of first training samples may be available for, among the multiple second computing apparatuses, only the one second computing apparatus where the first machine learning model is trained. For example, the plurality of first training samples available for only the one second computing apparatus may be obtained from a storage system/device (e.g., a picture archiving & communication (PAC) system in a hospital) only the one second computing apparatus may access. A first trained machine learning model may be trained using the plurality of first training samples based on a training algorithm. Exemplary training algorithms may include a gradient descent algorithm, Newton's algorithm, a Quasi-Newton algorithm, a Levenberg-Marquardt algorithm, a conjugate gradient algorithm, or the like, or a combination thereof. At least two of the plurality of first trained machine learning models may be trained using the same or different training algorithms. In some embodiments, during the training process of each of the plurality of first trained machine learning models, the multiple second computing apparatuses may not communicate with each other, i.e., the multiple second computing apparatuses may not share any data. In some embodiments, at least one of the plurality of first trained machine learning models may be generated by one of the multiple second computing apparatuses using a distributed learning technique. More descriptions of the distributed learning technique may be found elsewhere in the present disclosure (e.g., FIG. 1 and the descriptions thereof).

In 503, the first computing apparatus 120 (e.g., the acquisition module 402) may obtain a plurality of training samples. As used herein, the plurality of training samples obtained by the first computing apparatus 120 may also be referred to as second training samples. In some embodiments, the first computing apparatus 120 may obtain at least a portion of the plurality of second training samples from a storage device (e.g., the storage device 130, the storage 220, the storage unit 370) and/or a data resource of a third party (e.g., a public medical image database, e.g., the lung image database consortium (LIDC), the digital database for screening mammography (DDSM), etc.).

In some embodiments, the first computing apparatus 120 may generate at least a portion of the plurality of second training samples based on a plurality of generator models (also referred to as third trained machine learning models) acquired from the multiple second computing apparatuses. A generator model may be obtained from one of the multiple second computing apparatuses. A generator model may be generated by one of the multiple second computing apparatuses using a plurality of third training samples available for, among the multiple second computing apparatuses, only the one second computing apparatus. For example, a generator model may be generated by one of the multiple second computing apparatuses by training a third machine learning model using the plurality of third training samples. The generator model may be trained to generate one or more of the at least a portion of the plurality of second training samples by learning from the plurality of third training samples. For example, the generator model may be trained to learn a probability distribution of the plurality of third training samples and generate one or more of the at least a portion of the plurality of second training samples based on the probability distribution. A second training sample generated by the generator model may be also referred to as realistic looking data or simulated data. In some embodiments, the plurality of third training samples available for a second computing apparatus used for training the generator model may be the same as the plurality of first training samples available for the second computing apparatus used for training the first trained machine learning model by the same second computing apparatus. In some embodiments, at least a portion of the plurality of third training samples available for a second computing apparatus used for training the generator model may be different from each of the plurality of first training samples available for the second computing apparatus. In some embodiments, the plurality of third training samples available for a second computing apparatus used for training the generator model may be a subset of the plurality of first training samples available for the second computing apparatus used for training the first trained machine learning model by the same second computing apparatus. In some embodiments, the plurality of first training samples available for a second computing apparatus used for training the first trained machine learning model may be a subset of the plurality of third training samples available for the second computing apparatus used for training the generator model by the same second computing apparatus.

In some embodiments, a generator model provided by a second computing apparatus may be constructed based on a variational autoencoder (VA), a disentangled variational autoencoder, a generative adversarial network (GAN) model, or the like, or any combinations thereof. In some embodiments, a generator model and a first trained machine learning model obtained from the same second computing apparatus may be constructed based on machine learning models of the same type or different types. For example, a first trained machine learning model obtained from the second computing apparatus 111 may be constructed based on a CNN model, and a generator model obtained from the second computing apparatus 111 may be constructed based on a generative adversarial network model. As another example, the first trained machine learning model and the generator model obtained from the second computing apparatus 111 may be both constructed based on a GAN model. At least two of the plurality of generator models may be constructed based on machine learning models of the same type or different types. For example, a generator model obtained from the second computing apparatus 111 may be constructed based on a variational autoencoder, and a generator model obtained from the second computing apparatus 112 may be constructed based on a GAN model. As another example, generator models obtained from the second computing apparatus 111 and the second computing apparatus 112 may be both constructed based on a GAN model. In some embodiments, architecture parameters of at least two of the plurality of generator models may be partially or entirely different. For example, two generator models constructed based on machine learning models of the same type (e.g., a GAN model) may include the same or different total counts of layers, the same or different minibatch sizes, etc. In some embodiments, learning parameters (e.g., a connected weight between two connected nodes, a bias vector relating to a node, etc.) of at least two of the plurality of first trained machine learning models may be partially or entirely different. More descriptions of the generation and/or application of the plurality of generator models may be found elsewhere in the present disclosure (e.g., FIGS. 8-10, and the descriptions thereof).

In some embodiments, the plurality of training samples may include a first portion and a second portion. The first portion of the plurality of training samples may be available for the first computing apparatus 120. For example, the first portion of the plurality of training samples may be obtained from a storage device or a database (e.g., a picture archiving & communication system in a hospital) only the first computing apparatus 120 may access and/or a data resource of a third party (e.g., a public medical image database, e.g., the lung image database consortium (LIDC), the digital database for screening mammography (DDSM), etc.). The second portion of the plurality of training samples may be generated by one or more of the plurality of generator models, as aforementioned in the present disclosure.

In 505, the first computing apparatus 120 (e.g., the training module 404) may determine, based on the plurality of training samples and the plurality of first trained machine learning models, a second trained machine learning model using a teacher-student training technique. The second trained machine learning model may be constructed based on a deep learning model as described elsewhere in the present disclosure. The second trained machine learning model and at least one of the plurality of first trained machine learning models may be constructed based on machine learning models of the same type or different types. For example, the at least one of the plurality of first trained machine learning models may be constructed based on a CNN model, and the second trained machine learning model may be constructed based on an FCN model. As another example, the at least one of the plurality of first trained machine learning models and the second trained machine learning model may be both constructed based on a CNN model. In some embodiments, architecture parameters of at least one of the plurality of first trained machine learning models and the second trained machine learning model may be partially or entirely different. For example, the second trained machine learning models may include a total count of layers, the size of a kernel of a layer, etc., less than that of the at least one of the plurality of first trained machine learning models.

The teacher-student training technique may be performed to train a student model by learning from one or more teacher models and generate a trained student model. The teacher models and the student model may perform a similar task. For instance, both the teacher models and the student model may be configured to generate an output including an attenuation-corrected image based on an input including an image without the attenuation correction. As another example, both the teacher models and the student model may be configured to generate an output including a simulated magnetic resonance (MR) image based on an input including a computed tomography (CT) image. The student model may have a simpler architecture and/or better performance (e.g., higher accuracy) than the one or more teacher models. Using the teach-student training technique, the plurality of first trained machine learning models may serve as teacher models, and the second trained machine learning model may be a trained student model, i.e., the second trained machine learning model may be determined by learning from the plurality of first trained machine learning models.

In some embodiments, using the teacher-student training technique, the first computing apparatus 120 may train a second machine learning model based on outputs of the plurality of first trained machine learning. For example, the first computing apparatus 120 may input each of the plurality of second training samples to each of the plurality of first trained machine learning models and the second machine learning model to obtain a reference output and estimated output, respectively. The first computing apparatus 120 may train the second machine learning model by iteratively updating parameter values of the second machine learning model based on the reference output of each of the plurality of first trained machine learning model corresponding to each of the plurality of training samples and the estimated output of the second machine learning model. More descriptions regarding training the second machine learning model may be found elsewhere in the present disclosure (e.g., FIGS. 6-7 and the descriptions thereof).

In 507, the first computing apparatus 120 (e.g., the transmission module 406) may transmit the second trained machine learning model to at least one of the multiple second computing apparatuses. In some embodiments, the at least one of the multiple second computing apparatuses may use the second trained machine learning model to perform the task. In some embodiments, at least one of the multiple second computing apparatuses may update the first trained machine learning model using the received second trained machine learning model. In some embodiments, the at least one of the multiple second computing apparatuses may transmit the received second trained machine learning model to a client terminal (e.g., the terminals 140, an image post-processing workstation of an imaging device) for performing the task.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, one or more other optional operations (e.g., a storing operation) may be added elsewhere in the process 500. In the storing operation, the first computing apparatus 120 may store information and/or data (e.g., the first trained machine learning models, the second trained machine learning models, the third trained machine learning models, etc.) associated with the distributed learning system 100 in a storage device (e.g., the storage device 130) disclosed elsewhere in the present disclosure.

Figure 6:
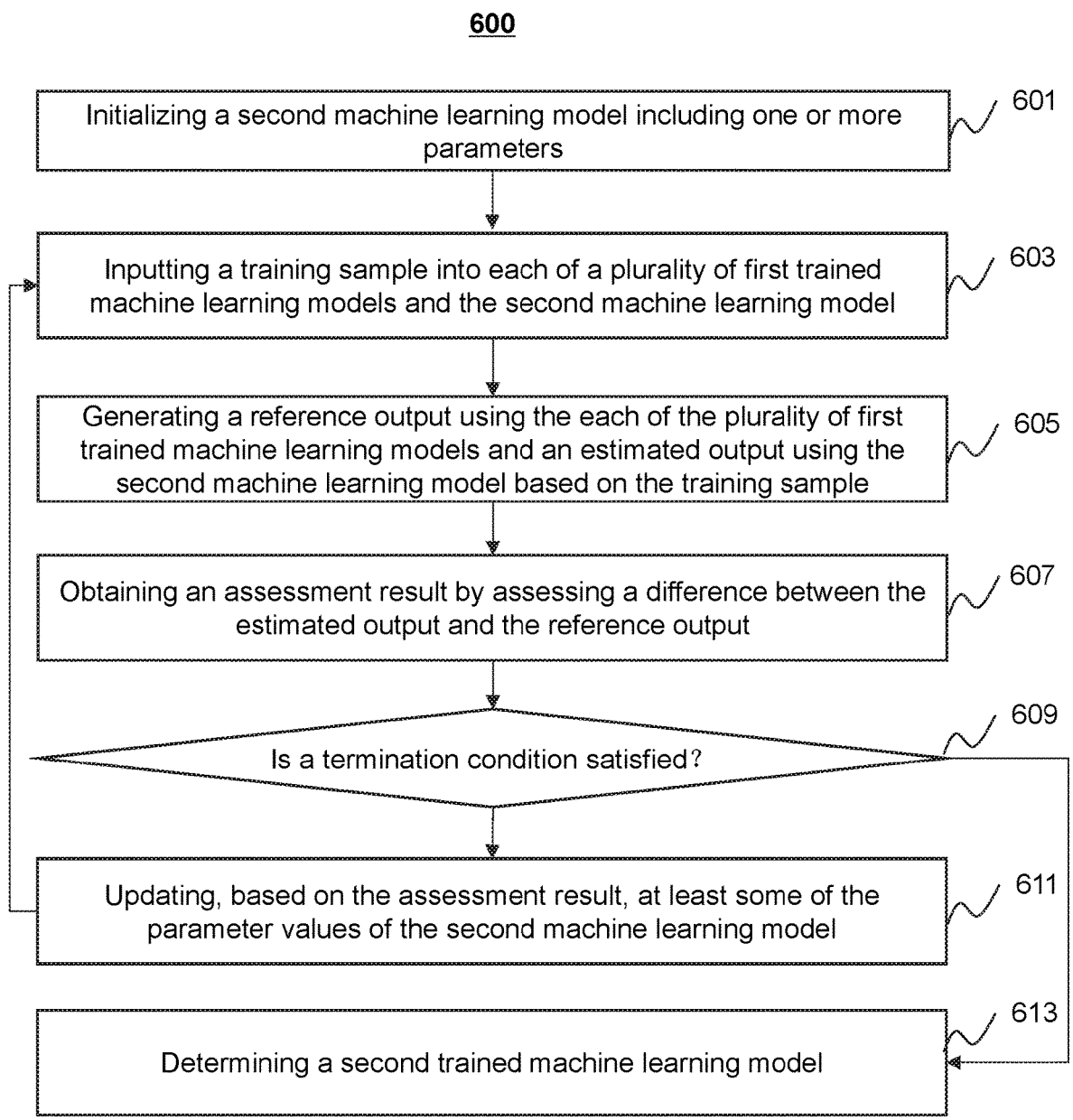
FIG. 6 is a schematic flowchart illustrating an exemplary process for determining a second trained machine learning model according to some embodiments of the present disclosure.

FIG. 6 is a schematic flowchart illustrating an exemplary process for determining a second trained machine learning model according to some embodiments of the present disclosure. In some embodiments, process 600 may be implemented as a set of instructions (e.g., an application) stored in the storage device 130, storage 220, or storage 390. The first computing apparatus 120, the processor 210 and/or the CPU 340 may execute the set of instructions, and when executing the instructions, the first computing apparatus 120, the processor 210 and/or the CPU 340 may be configured to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting. In some embodiments, the second trained machine learning model described in connection with operation 505 in FIG. 5 may be obtained according to the process 600.

In 601, the first computing apparatus 120 (e.g., the training module 404) may initialize a second machine learning model including one or more parameters. The second machine learning model may be obtained as described in connection with operation 505.

In some embodiments, the one or more parameters of the second machine learning model may include a plurality of architecture parameters and a plurality of learning parameters. Exemplary architecture parameters of the second machine learning model may include the size of a convolutional kernel, the number of layers, the number of nodes in each layer, a learning rate, a minibatch size, an epoch, etc. Exemplary learning parameters of the second machine learning model may include a connected weight between two connected nodes, a bias vector relating to a node, etc. The connected weight between two connected nodes may be configured to represent a proportion of an output value of a node to be as an input value of another connected node. In some embodiments, the connected weights of the second machine learning model may be initialized to be random values in a range, e.g., the range from −1 to 1. In some embodiments, all the connected weights of the second machine learning model may have the same value in the range from −1 to 1, for example, 0. The bias vector relating to a node may be configured to control an output value of the node deviating from an origin. In some embodiments, the bias vector of nodes in the second machine learning model may be initialized to be random values in a range from 0 to 1. In some embodiments, the parameters of the second machine learning model may be initialized based on a Gaussian random algorithm, a Xavier algorithm, etc. In some embodiments, the learning parameters may be initialized based on the learning parameters of at least one of a plurality of first trained machine learning models as described in connection with operation 501 illustrated in FIG. 5 For example, the first computing apparatus 120 may designate at least a portion of the learning parameters of a first trained machine learning model as the initialized parameters of the second machine learning model.

In 603, the first computing apparatus 120 (e.g., the training module 404) may input a training sample into each of a plurality of first trained machine learning models and the second machine learning model. The plurality of first trained machine learning models may be obtained as described in connection with operation 501 illustrated in FIG. 5. The training sample may be also referred to as a second training sample as described in connection with operations 503 illustrated in FIG. 5. In some embodiments, the plurality of first trained machine learning models and the second machine learning model may share the same input layer. The training sample may be feed to each of the plurality of first trained machine learning models and the second machine learning model via the same input layer.

In 605, the first computing apparatus 120 (e.g., the training module 404) may generate a reference output using the each of the plurality of first trained machine learning models and an estimated output using the second machine learning model based on the training sample. The plurality of first trained machine learning models may generate a plurality of reference outputs based on the inputted training sample. In some embodiments, each of the plurality of first trained machine learning models and/or the second machine learning model may extract image features (e.g., a low-level feature (e.g., an edge feature, a texture feature), a high-level feature (e.g., a semantic feature), or a complicated feature (e.g., a deep hierarchical feature) from the inputted training sample. Each of the plurality of first trained machine learning models and/or the second machine learning model may generate the reference output and/or the estimated output based on the image features. In some embodiments, the plurality of first trained machine learning models and the second machine learning model may share one or more same feature extraction layers (e.g., one or more convolution layers). The image features extracted by the one or more same feature extraction layers may be feed into other layers (e.g., hidden layers) of each of the plurality of first trained machine learning models and the second machine learning model to generate the reference output and the estimated output, respectively.

In 607, the first computing apparatus 120 (e.g., the training module 404) may obtain an assessment result by assessing a difference between the estimated output and the reference output.

In some embodiments, the estimated output and the reference output may be inputted to an assessment layer (e.g., a loss function layer) for assessing the difference between the estimated output and the reference output of each of the plurality of first trained machine learning model. In some embodiments, the assessment result for assessing the difference between the estimated output and the reference output may be determined based on a cost function. In some embodiments, the difference between the estimated output and the reference output may include an average difference (or average error). The assessment of the difference between the estimated output and the reference output may include determining a value of the cost function relating to the average difference. For example, an average output may be determined by averaging the plurality of reference outputs corresponding to the plurality of first trained machine learning models. The average difference may be determined by comparing the estimated output and the average output based on the cost function. As another example, multiple errors between the estimated output and the reference outputs generated by the plurality of first trained machine learning models may be determined based on the cost function. The average difference may be determined by averaging the multiple errors based on the cost function.

In some embodiments, the difference between the estimated output and the reference output may include a total difference (i.e., total error). The assessment of the difference between the estimated output and the reference output may include determining a value of the cost function relating to the total difference. The total difference may include multiple errors each of which between the estimated output and the reference output of the each of the plurality of first trained machine learning models.

In 609, the first computing apparatus 120 (e.g., the training module 404) may determine whether a termination condition is satisfied. If the termination condition is satisfied, process 609 may proceed to operation 613. If the termination condition is not satisfied, process 609 may proceed to 611. The termination condition may provide an indication of whether the second machine learning model is sufficiently trained.

In some embodiments, the termination condition may relate to a value of a cost function. For example, the termination condition may be satisfied if the value of the cost function (e.g., the value of the cost function) is minimal or smaller than a threshold (e.g., a constant). As another example, the termination condition may be satisfied if the value of the cost function converges. In some embodiments, convergence may be deemed to have occurred if the variation of the values of the cost function (e.g., the value of the cost function) in two or more consecutive iterations is equal to or smaller than a threshold (e.g., a constant). In some embodiments, convergence may be deemed to have occurred if a difference between the value of the cost function (e.g., the value of the cost function) and a target value is equal to or smaller than a threshold (e.g., a constant). In some embodiments, the termination condition may be satisfied when a specified iteration number (or count) is performed in the training process.

In 611, the first computing apparatus 120 (e.g., the training module 404) may update at least some of the parameter values of the second machine learning model. In some embodiments, at least one of the plurality of learning parameters may be adjusted. For example, the parameter value of at least some nodes may be adjusted until the value of the cost function satisfies a condition (e.g., exceeding a threshold). In some embodiments, the plurality of learning parameters of the second machine learning model may be adjusted based on a back-propagation (BP) algorithm. Exemplary BP algorithms may include a stochastic gradient descent algorithm, an Adam algorithm, an Adagrad algorithm, an Adadelta algorithm, an RMSprop algorithm, or the like, or a combination thereof. In some embodiments, the first computing apparatus 120 may update the values of the parameters by performing an iteration of a backpropagation neural network training procedure, e.g., a stochastic gradient descent backpropagation training technique, to determine the updated values of the parameters of the neural network. That is, the first computing apparatus 120 may backpropagate the value of the cost function determined for the output of the output layer of the second machine learning model through to each layer below the output layer in the second machine learning model in order to adjust the parameters of each of the layers of the second machine learning model.

In 613, the first computing apparatus 120 (e.g., the training module 404) may determine a second trained machine learning model. In some embodiments, the second trained machine learning model may be determined based on the updated parameters.

In some embodiments, process 600 may be repeated with respect to a plurality of training samples to improve or optimize the second machine learning model until a termination condition is satisfied. In different rounds of process 600, different training samples may be inputted into the second machine learning model. In some embodiments, the termination condition may be that a specific number of training samples have been analyzed. In some embodiments, the termination condition may be that a specific number of iterations have been performed.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operations 605 and 607 may be integrated into one operation. As another example, operation 603 may be omitted.

Figure 7:
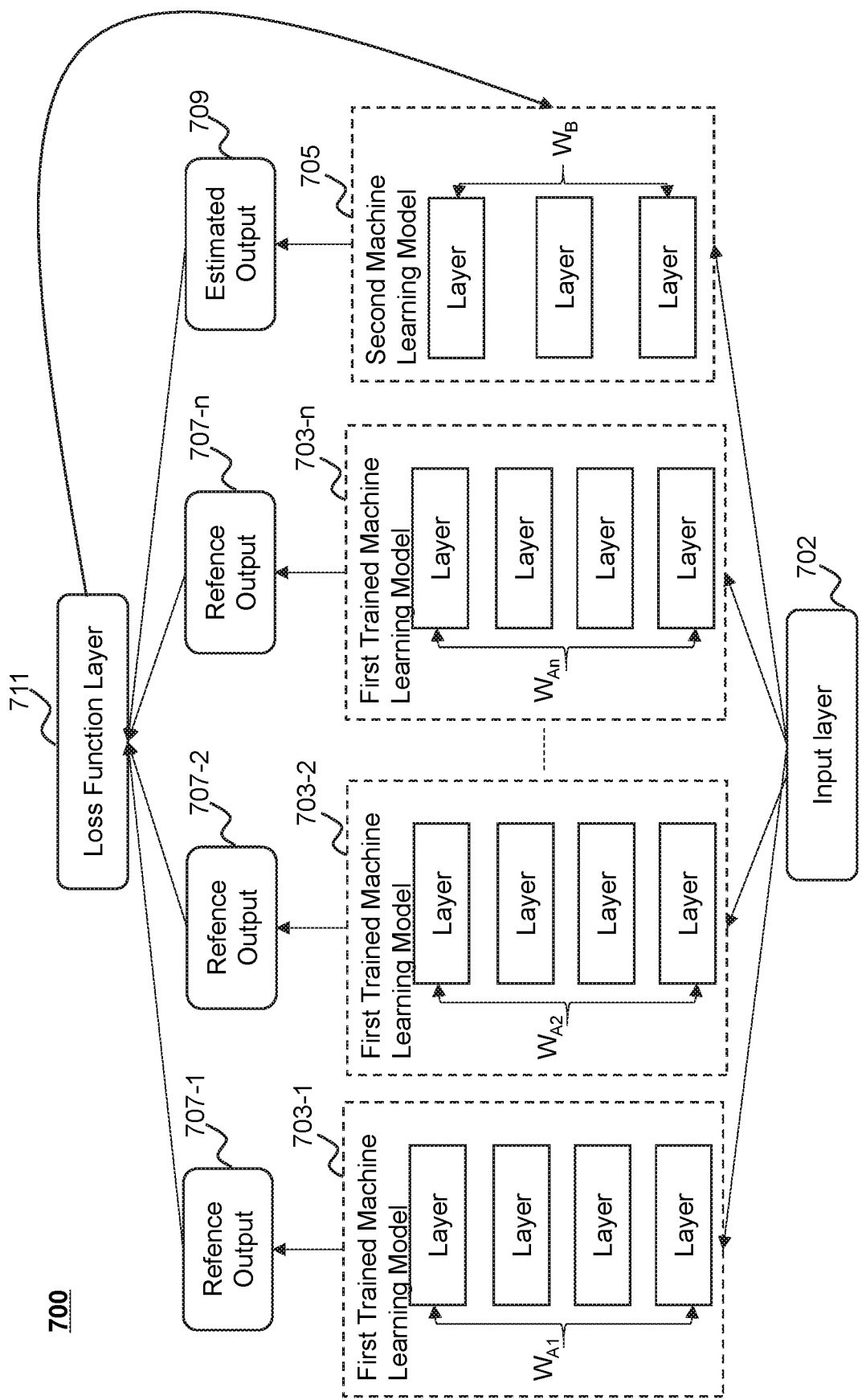
FIG. 7 is a schematic diagram illustrating an exemplary teacher-student training framework according to some embodiments of the present disclosure.

FIG. 7 is a schematic diagram illustrating an exemplary teacher-student training framework according to some embodiments of the present disclosure.

As shown in FIG. 7, the teacher-student training framework 700 may include a plurality of first trained machine learning models (e.g., a first trained machine learning model 703-1, a first trained machine learning model 703-2, . . . , a first trained machine learning model 703-$n$) serving as teacher models. The second machine learning model 705 (also referred to as a student model) may learn from the plurality of first trained machine learning models. Each of the plurality of first trained machine learning models may include multiple parameters that have been determined after the training of the each of the plurality of first trained machine learning models. For example, the first trained machine learning model 703-1 may include parameters $W_{A1}$, the first trained machine learning model 703-2 may include parameters $W_{A2}$, . . . , and the first trained machine learning model 703-$n$ may include parameters $W_{An}$.

During a training process, the second machine learning model 705 may be initialized with one or more parameters $W_B$. The second machine learning model 705 may be trained based on a plurality of training samples and the plurality of first trained machine learning models. Specifically, a training sample may be input to the plurality of first trained machine learning models and the second machine learning model 705 via an input layer 702. The plurality of first trained machine learning models may generate a plurality of reference outputs (i.e., a reference output 707-1, a reference output 707-2, . . . , and a reference output 707-$n$, respectively) based on the training sample. The second machine learning model 705 may generate an estimated output 709 based on the training sample. The plurality of reference outputs and the estimated output 709 may be inputted into a loss function layer 711 that is configured with a loss function (i.e., cost function). The value of the loss function may be determined based on the reference outputs (i.e., a reference output 707-1, a reference output 707-2, . . . , and a reference output 707-$n$) and the estimated output 709. The value of the loss function may indicate the error or difference between the reference outputs (i.e., a reference output 707-1, a reference output 707-2, . . . , and a reference output 707-$n$) and the estimated output 709. The value of the loss function may be transferred to each layer of the second machine learning model 705. The second machine learning model 705 may be updated by adjusting the parameters $W_B$ based on the value of the loss function. The values of the parameters $W_B$ may be updated by performing an iteration of a backpropagation training procedure, e.g., a stochastic gradient descent backpropagation training technique, to determine the updated values of the parameters $W_B$ of the second machine learning model. That is, the error determined by the loss function layer 711 may be backpropagated through to each layer below the output layer of the second machine learning model in order to adjust the parameters of each of the layers of the second machine learning model.

Figure 8:
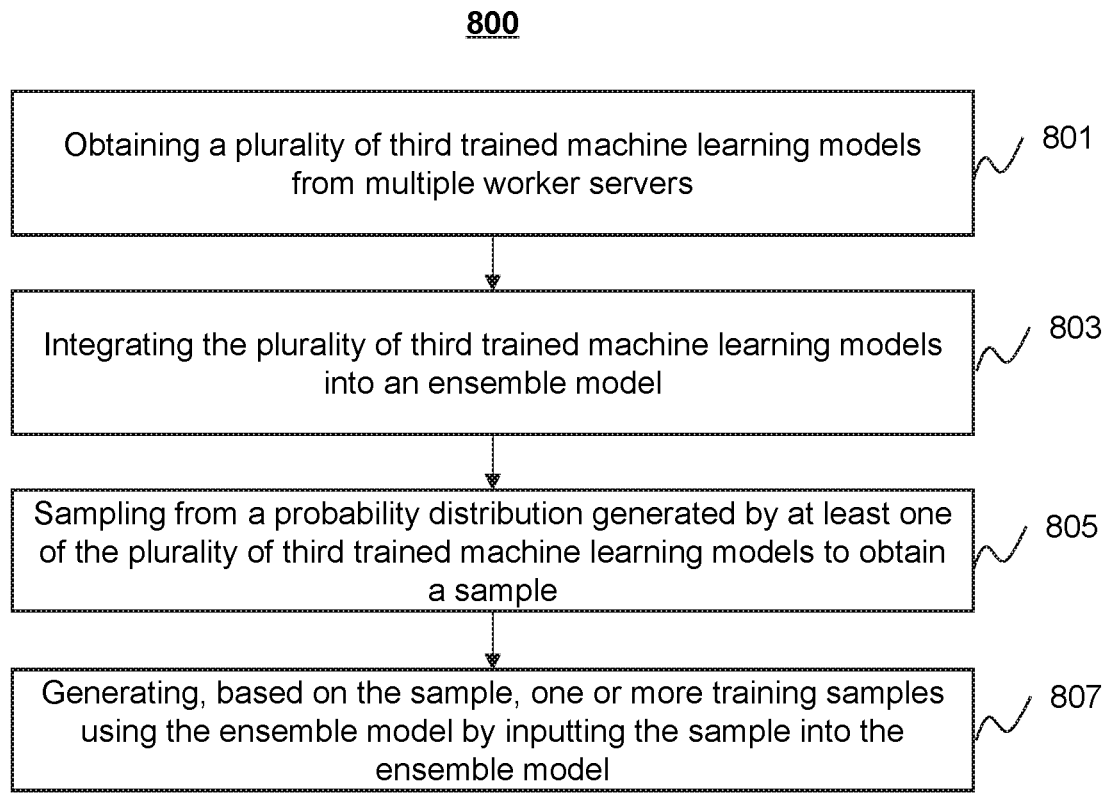
FIG. 8 is a schematic flowchart illustrating an exemplary process for generating one or more training samples according to some embodiments of the present disclosure.

FIG. 8 is a schematic flowchart illustrating an exemplary process for generating one or more training samples according to some embodiments of the present disclosure. In some embodiments, process 800 may be implemented as a set of instructions (e.g., an application) stored in the storage device 130, storage 220, or storage 390. The first computing apparatus 120, the processor 210 and/or the CPU 340 may execute the set of instructions, and when executing the instructions, the first computing apparatus 120, the processor 210 and/or the CPU 340 may be configured to perform the process 800. The operations of the illustrated process presented below are intended to be illustrative. In some embodiments, the process 600 may be accomplished with one or more additional operations not described and/or without one or more of the operations discussed. Additionally, the order of the operations of process 800 illustrated in FIG. 8 and described below is not intended to be limiting. In some embodiments, at least a portion of the plurality of training samples described in connection with operation 503 in FIG. 5 may be obtained according to the process 800.

In 801, the first computing apparatus 120 (e.g., the acquisition module 402) may obtain a plurality of third trained machine learning models (also referred to as generator models) from multiple workers (i.e., second computing apparatuses) (e.g., the second computing apparatuses 110).

Each of the plurality of third trained machine learning models may be generated by one of the multiple second computing apparatuses using a plurality of third training samples available for, among the multiple second computing apparatuses, only the one second computing apparatus to train a third machine learning model. A third training sample may include an image (e.g., a CT image, an MR image, a PET image, etc.) generated by an imaging device scanning a subject. During the training process of a third machine learning model, the third machine learning model may learn to generate, based on an inputted third training sample, a simulated image. For example, the third machine learning model may extract image features from the inputted third training sample and generate the simulated image based on the extracted image features. As a further example, the third machine learning model may generate a probability distribution (e.g., a normal distribution) corresponding to each of the plurality of third training samples and sample from the probability distribution to generate the simulated image. At the ending of the training process, the third machine learning model may generate a plurality of probability distributions of the plurality of third training samples and combine the plurality of probability distributions into a comprehensive probability distribution. The third trained machine learning model may generate a sample from the comprehensive probability distribution and generate a simulated image based on the sample.

In some embodiments, a third machine learning model may include a first neural network (also referred to as an encoder) that has a first set of parameters to be optimized by training. The first neural network may be configured to extract image features from each third training sample and describe the extracted image features as feature vectors in a latent space (or vector space) using a probability distribution (e.g., a normal distribution). The third machine learning model may include a second neural network (also referred to as a decoder network) that has a second set of parameters to be optimized by training. The second neural network model may be configured to generate an estimated image based on a sample (e.g., a feature vector) extracted from the latent space (i.e., the probability distribution). A third trained learning model may be obtained by performing a plurality of iterations to iteratively update the first set of parameters and the second set of parameters. For each iteration, a third training sample may be input into a third machine learning model. The first neural network may learn and generate a probability distribution of the third training sample by processing extracted image features. The second neural network may sample from the probability distribution to obtain a feature vector and decode the feature vector to generate an estimated image. The third machine learning model may compare the estimated image with the training sample based on a cost function (e.g., a quality metric) The cost function may indicate a degree of similarity or difference between the estimated image and the third training sample. If the value of the cost function exceeds a threshold in a current iteration, the first set of parameters and/or the second set of parameters may be adjusted and/or updated to cause the value of the cost function (e.g., the degree of difference between the estimated output image and the input specific reference image) smaller than the threshold. Accordingly, in the next iteration, another third training sample may be input into the third machine learning model to train the third machine learning model as described above. Then multiple iterations may be performed to update the first set of parameters and/or the second set of parameters until a termination condition is satisfied. The trained second neural network with a plurality of probability distributions (or one single probability distribution) may be designated as a trained machine learning model.

In 803, the first computing apparatus 120 (e.g., the acquisition module 402) may integrate the plurality of third trained machine learning models into an ensemble model. In some embodiments, the plurality of third trained machine learning models may be integrated into the ensemble model by sharing one or more layers (e.g., an input layer). In some embodiments, the ensemble model may include a target probability distribution. The target probability distribution may include a combination of a plurality of comprehensive probability distributions each of which is generated by the plurality of third trained machine learning models.

Figure 10:
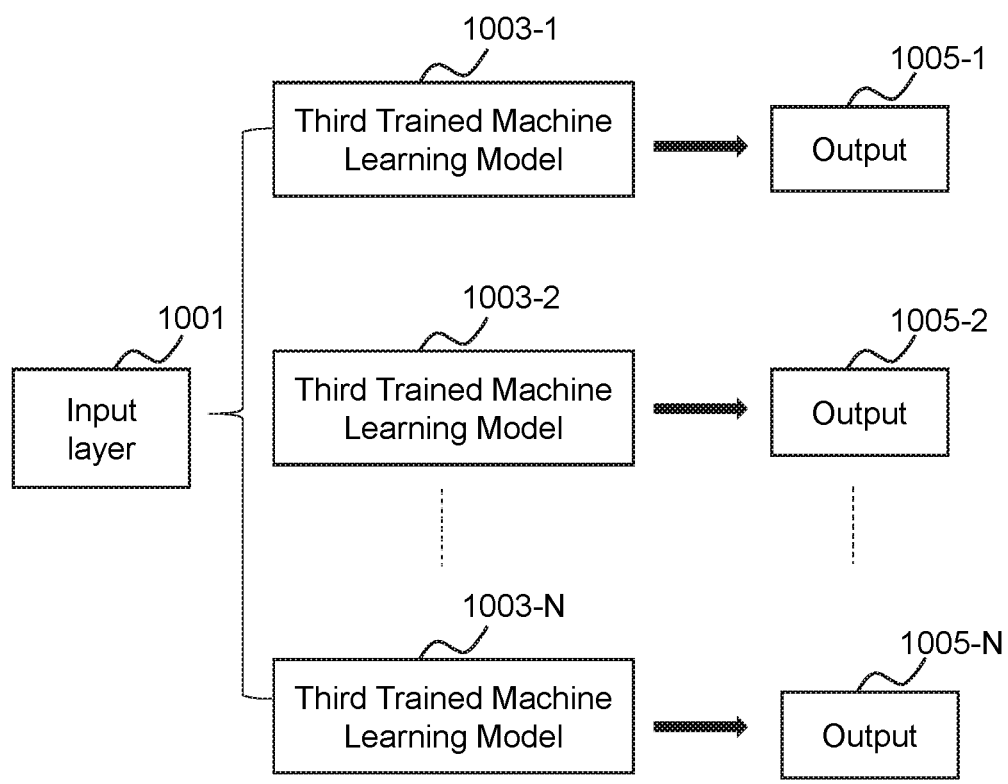
FIG. 10 is a schematic diagram illustrating an exemplary ensemble model including a plurality of third trained machine learning models according to some embodiments of the present disclosure.

As shown in FIG. 10, an exemplary ensemble model 1000 including a plurality of third trained machine learning models may be provided for illustration purposes. The plurality of third trained machine learning models (i.e., a third trained machine learning model 1003-1, a third trained machine learning model 1003-2, . . . , a third trained machine learning model 1003-N) in the ensemble model may share a same input layer 1001. The plurality pf third trained machine learning models may generate a plurality of outputs (i.e., an output 1005-1, an output 1005-2, . . . , and an output 1005-N) based on an input of the input layer 1001.

In 805, the first computing apparatus 120 (e.g., the acquisition module 402) may sample from a probability distribution generated by at least one of the plurality of third trained machine learning models to obtain a sample. In some embodiments, the probability distribution may include a standard normal distribution. The sample may be randomly sampled from the probability distribution. The sample may include a feature vector.

In 807, the first computing apparatus 120 (e.g., the acquisition module 402) may generate, based on the sample, one or more training samples using the ensemble model by inputting the sample into the ensemble model. Each of the plurality of third trained machine learning models may generate one of the one or more training samples (e.g., the output 1005-1, the output 1005-2, . . . , and the output 1005-N) based on the inputted sample. The one or more training samples generated by the ensemble model corresponding to the same sample may be different from each other. Operations 805-807 may be repeated until the number of training samples reaches a count threshold. The training samples generated by the plurality of third trained machine learning models (i.e., the generator models) may serve as inputs of teacher models (e.g., the first trained machine learning models as described in FIGS. 5-6) and a student model (e.g., the second machine learning model as described in FIGS. 5-6). The student model may learn from the teacher models based on a plurality of training samples at least a portion of which may be generated by the generator models.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, operations 805 and 807 may be integrated into an operation. Operation 803 may be omitted.

Figure 9:
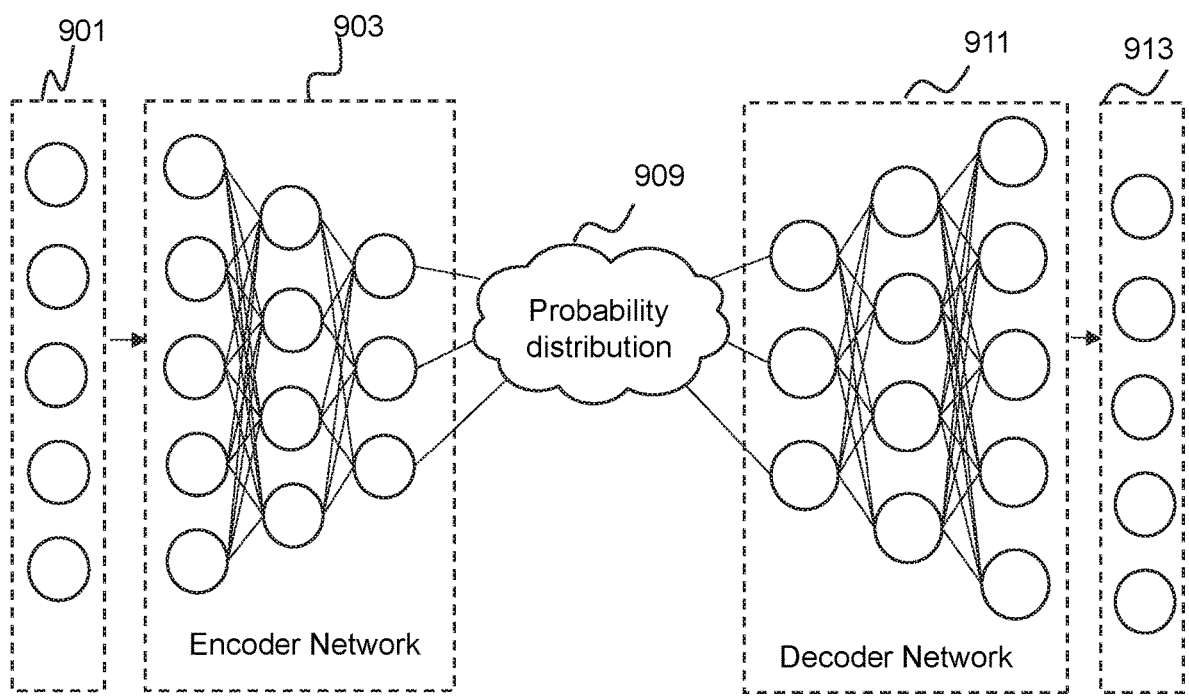
FIG. 9 is a schematic diagram illustrating an exemplary generator model according to some embodiments of the present disclosure.

FIG. 9 is a schematic diagram illustrating an exemplary generator model according to some embodiments of the present disclosure.

As shown in FIG. 9, an exemplary generator model such as a variational autoencoder may be shown for illustration purposes. The generator model may include an input layer 901, an encoder network 903, a decoder network 911, and an output layer 913. During the training process of the generator model 900, the encoder network 903 may encode an input (e.g., an image) to generate a probability distribution and the decoder network 911 may generate an output by sampling from the probability distribution. The parameters of the encoder network 903 and the decoder network 911 may be iteratively updated until a terminal condition is satisfied as described in FIG. 8. After the training process, a generator model may be determined by eliminating the encoder network 903 from the generator model 900. The generator model may also include optimized parameters, such as mean vectors and standard deviation vectors which may be used to process a sample extracted from the probability distribution for generating an image.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system, comprising:
a first computing apparatus in communication with multiple second computing apparatuses, the first computing apparatus including at least one processor and at least one storage device storing executable instructions, when executing the executable instructions, the at least one processor is configured to cause the system to perform operations including:
obtaining a plurality of first trained machine learning models for a task from the multiple second computing apparatuses, at least a portion of parameter values of the plurality of first trained machine learning models being different from each other;
obtaining a plurality of training samples; and
determining, based on the plurality of training samples, a second trained machine learning model by learning from the plurality of first trained machine learning models by:
training, based on a reference output of each of the plurality of first trained machine learning models corresponding to each of the plurality of training samples, a second machine learning model using the plurality of training samples to obtain the second trained machine learning model by:
initializing parameter values of the second machine learning model; and
training the second trained machine learning model by iteratively updating, based on the plurality of training samples, the parameter values of the second machine learning model based on a reference output of each of the plurality of first trained machine learning models corresponding to each of the plurality of training samples.

2. The system of claim 1, wherein the task includes at least one of an image classification, an image segmentation, an image denoising, or an image identification.

3. The system of claim 1, wherein each of at least one of the multiple second computing apparatuses includes a plurality of computing units, and one of the plurality of first trained machine learning models is provided by the each of the at least one of the multiple second computing apparatuses using the plurality of computing units by distributed learning technique.

4. The system of claim 1, wherein at least one of the plurality of first trained machine learning models is provided by one of the multiple second computing apparatuses that trains a first machine learning model using a plurality of first training samples available for, among the multiple second computing apparatuses, only the one second computing apparatus.

5. The system of claim 1, wherein at least two of the plurality of first trained machine learning models are constructed based on a same machine learning model or different machine learning models.

6. The system of claim 1, wherein iteratively updating the parameter values of the second machine learning model includes performing an iterative process, for each iteration of the iterative process,
inputting a training sample of the plurality of training samples into each of the plurality of first trained machine learning models;

generating the reference output using the each of the plurality of first trained machine learning models based on the training sample;

inputting the training sample and the reference output into the second machine learning model;

generating an estimated output of the second machine learning model based on the training sample;

obtaining an assessment result by assessing a difference between the estimated output and the reference output; and updating, based on the assessment result, at least some of the parameter values of the second machine learning model.

7. The system of claim 6, wherein obtaining an assessment result by assessing a difference between the estimated output and the reference output includes determining a value of a cost function relating to the difference between the estimated output and the reference output, and the assessment result includes whether a termination condition is satisfied, the termination condition relating to the cost function or an iteration count of the iterative process.

8. The system of claim 1, wherein at least one of the plurality of first trained machine learning model and the trained second machine learning model includes a deep learning model.

9. The system of claim 1, wherein to obtain a plurality of training samples, the at least one processor is configured to cause the system to perform additional operations including:

obtaining a plurality of third trained machine learning models from the multiple second computing apparatuses; and generating, based on the plurality of third trained machine learning models, at least a portion of the plurality of training samples, wherein each of the plurality of third trained machine learning models is configured to generate a portion of the plurality of training samples.

10. The system of claim 9, wherein each of the plurality of third trained machine learning models is generated by one of the multiple second computing apparatuses that trains a third machine learning model using the plurality of third training samples available for, among the multiple second computing apparatuses, only the one second computing apparatus.

11. The system of claim 9, wherein the third trained machine learning model is constructed based on one of a variational autoencoder, a disentangled variational autoencoder, and a generative adversarial network model.

12. The system of claim 9, wherein the at least one processor is configured to cause the system to perform additional operations including:

integrating the plurality of third trained machine learning models into an ensemble model; and generating the at least a portion of the plurality of training samples using the ensemble model.

13. The system of claim 12, wherein to generate the at least a portion of the plurality of training samples using the ensemble model, the at least one processor is further configured to cause the system to perform additional operations including:

obtaining one or more samples by sampling from a probability distribution associated with the plurality of third training samples and generated by at least one of the plurality of third trained machine learning models;

inputting each of the one or more samples into the ensemble model; and generating, based on the each of the one or more samples, one or more second training samples using the ensemble model.

14. The system of claim 9, wherein the plurality of training samples include a first portion and a second portion, the first portion of the plurality of training samples being acquired by the first computing apparatus from a database, and the second portion of the plurality of training samples being generated by one or more of the plurality of third trained machine learning models.

15. The system of claim 1, wherein the at least one processor is configured to cause the system to perform additional operations including:

transmitting the second trained machine learning model to at least one of the multiple second computing apparatuses.

16. A computing apparatus, comprising:

at least one processor and at least one storage device storing executable instructions, when executing the executable instructions, the at least one processor is configured to perform operations including:

obtaining a plurality of first training samples;

obtaining a first trained machine learning model by training a first machine learning model using the plurality of first training samples;

transmitting the first trained machine learning model to a server that is configured to receive a plurality of first trained machine learning models from a plurality of computing devices, the server being configured to determine a second trained machine learning model by training a second machine learning model based on a plurality of second training samples and the plurality of first trained machine learning models using a teacher-student training technique by:

training, based on a reference output of each of the plurality of first trained machine learning models corresponding to each of the plurality of second training samples, the second machine learning model using the plurality of second training samples to obtain the second trained machine learning mode by:

initializing parameter values of the second machine learning model; and training the second trained machine learning model by iteratively updating, based on the plurality of second training samples, the parameter values of the second machine learning model based on a reference output of each of the plurality of first trained machine learning models corresponding to each of the plurality of second training samples; and receiving the second trained machine learning model from the server.

17. A system, comprising:

a first computing apparatus in communication with multiple second computing apparatuses, the first computing apparatus including at least one processor and at least one storage device storing executable instructions, when executing the executable instructions, the at least one processor is configured to cause the system to perform operations including:

obtaining a plurality of first trained machine learning models for a task from the multiple second computing apparatuses, at least a portion of parameter values of the plurality of first trained machine learning models being different from each other;

obtaining a plurality of training samples by:
  obtaining a plurality of generator models from the multiple second computing apparatuses;
  generating, based on the plurality of generator models, the plurality of training samples, wherein each of the plurality of generator models is configured to generate one of the plurality of training samples; and
determining, based on the plurality of training samples, a trained machine learning model by learning from the plurality of first trained machined learned models by:
  training, based on a reference output of each of the plurality of first trained machine learning models corresponding to each of the plurality of training samples, a second machine learning model using the plurality of training samples to obtain the second trained machine learning model by:
    initializing parameter values of the second machine learning model; and
    training the second trained machine learning model by iteratively updating, based on the plurality of training samples, the parameter values of the second machine learning model based on a reference output of each of the plurality of first trained machine learning models corresponding to each of the plurality of training samples.

* * * * *